United States Patent [19]
Brownlee

[11] 3,745,688
[45] July 17, 1973

[54] FISHING DEVICE
[76] Inventor: Winston E. Brownlee, 215 St. Mary's St., Suttons Bay, Mich. 149684
[22] Filed: Apr. 19, 1971
[21] Appl. No.: 135,208

[52] U.S. Cl. ............ 43/43.12, 24/201 TR, 43/42.72
[51] Int. Cl. .............................................. A01k 91/04
[58] Field of Search .................... 43/43.12, 42.72, 43/42.04, 44.88, 19; 24/201 TR, 216, 217, 218

[56] References Cited
UNITED STATES PATENTS

| | | | |
|---|---|---|---|
| 2,858,637 | 11/1958 | Stark | 43/43.12 |
| 3,518,784 | 7/1970 | Kling et al. | 43/43.12 |
| 1,564,147 | 12/1925 | Stickley et al. | 43/43.12 |
| 3,091,885 | 6/1963 | Ulsh | 43/43.12 X |
| 3,210,883 | 10/1965 | Ulsh | 43/43.12 |

Primary Examiner—Louis G. Mancene
Assistant Examiner—James H. Czerwonky
Attorney—Woodhams, Blanchard & Flynn

[57] ABSTRACT

A fishing device, in particular, a release device adapted be be connected between a trolling line and either an outrigger or a downrigger for permitting controlled release of the line. The release device includes a resilient plug having a first connecting pin fixedly secured thereto for connection to either the outrigger or the downrigger. A second connecting pin is slidably and frictionally received within one of a plurality of different sized bores formed in the resilient plug, the magnitude of frictional engagement between the second connecting pin and the resilient plug being determined by the size of the selected bore. The second connecting pin is interconnected to the trolling line and is slidably releasable from the resilient plug in response to a predetermined drag imposed on the line.

10 Claims, 7 Drawing Figures

PATENTED JUL 17 1973  3,745,688

INVENTOR
WINSTON E. BROWNLEE
BY
Woodhams, Blanchard & Flynn
ATTORNEYS

FISHING DEVICE

FIELD OF THE INVENTION

This invention relates to a fishing device and, in particular, relates to a release device adapted for connection between a trolling line and either an outrigger or a downrigger for permitting controlled release of the trolling line.

BACKGROUND OF THE INVENTION

Various types of release mechanisms are known for use in connecting a trolling line to either an outrigger or a downrigger for permitting release of a trolling line in response to the application of a predetermined drag thereon, such as occurs when a fish is hooked. However, all of these prior devices have, to my knowledge, utilized a spring-type load release whereby the trolling line is released from the outrigger or downrigger only after the drag imposed on the trolling line is sufficient to overcome the spring force. While these release devices operate in a generally satisfactory manner, nevertheless they are awkward to use and they are satisfactorily usable only with selected types (fighting ability) and sizes (weight) of fish. For example, for optimum trolling, the amount of release force necessary to release the trolling line will depend upon the type and/or size of fish. On the other hand, the known spring-type release mechanisms are generally capable of providing only a relatively constant release force, and thus these devices cannot readily be adjusted so as to selectively vary the release force in accordance with the type and/or size of fish being sought by the fisherman. To overcome this disadvantage it has generally been necessary for a fisherman to possess a large number of spring-type release mechanisms, which mechanisms are of different sizes so as to provide a wide range of release forces suitable for the type of trolling desired.

A further disadvantage of the known spring-type release mechanisms has been their inability to withstand long and repeated usage. Particularly, such devices contain a relatively large number of parts which are subject to failure or damage during repeated usage. Further, due to the presence of the springs and associated structure, these devices are also subject to deterioration and rusting, and the devices often become fouled due to material becoming caught within the spring, thereby preventing proper operation thereof.

Accordingly, it is an object of this invention to provide an improved fishing device and, in particular, an improved release device for enabling the controlled release of a trolling line, which release device overcomes the above-mentioned disadvantages.

Particularly, it is an object of the present invention to provide a release device, as aforesaid, for providing a controllable release force, with the device being selectively and easily adjustable for permitting the release force to be selectively varied.

A further object of the present invention is to provide a release device, as aforesaid, which does not utilize conventional springs therein, and wherein the release force is created solely by frictional engagement between a retainer member and a release member.

A still further object of the present invention is to provide a release device, as aforesaid, wherein a resilient plug-like retainer is disposed for interconnection to the rigging means and frictionally but releasably engages a slide pin which is interconnected to the trolling line, with the slide pin being releasable from the resilient retainer in response to imposition of a predetermined release force thereon.

Another object of the present invention is to provide a release device, as aforesaid, wherein the retainer plug has a plurality of different sized bores therein with said slide pin being adapted to be received within any one of said bores and wherein the size of the selected bore determines the frictional engagement with the slide pin and consequently the magnitude of the release force.

Still a further object of the present invention is to provide a release device, as aforesaid, which is simple and inexpensive to manufacture, which is easily usable, which can be easily adjusted to vary the release force, which can be repetitively used without substantial wear or damage, and which is not subject to wear or deterioration due to its intermittent contact with water.

Other objects and purposes of this invention will be apparent to persons acquainted with devices of this type upon reading the following specification and inspecting the accompanying drawings.

Figure 1:
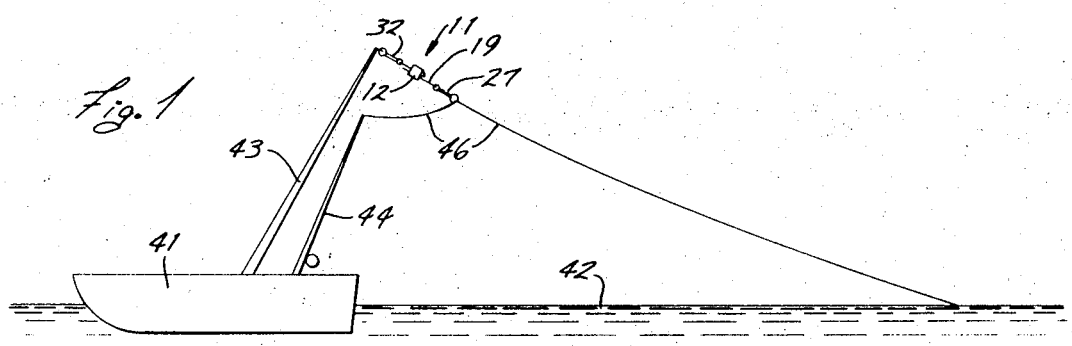
FIG. 1 illustrates therein use of a release mechanism constructed according to the present invention in conjunction with an outrigger.

Certain terminology will be used in the following description for convenience in reference only and will not be limiting. For example, the words "rightwardly," "leftwardly," "upwardly" and "downwardly" will refer to directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

The objects and purposes of the present invention are met by providing a release device which includes a resilient retainer member, preferably constructed from elastomeric plastic in the form of a cylindrical plug. A first connecting pin is fixedly connected to the retainer plug and extends axially from one end thereof. The first connecting pin is provided with a fastening device, such as an eye, on the free end thereof for permitting same to be suitably fixedly connected to rigging means, such as either an outrigger or a downrigger. A second connecting pin is releasably received in the retainer plug and extends outwardly from the other end thereof, said second connecting pin also being provided with a fastening means, such as an eye, on the end thereof for permitting same to be connected to a trolling line. The second connecting pin is slidably received within a bore formed in the retainer plug, being retained within the bore solely due to the frictional engagement between the pin and the resilient retainer member. The resilient retainer plug is preferably provided with a plurality of different sized bores therein each adapted to slidably receive the second connecting pin whereupon the frictional engagement between the retainer member and the pin can thus be selectively varied according to the selected bore in which is positioned the second connecting pin.

DETAILED DESCRIPTION

Figures 3, 6:
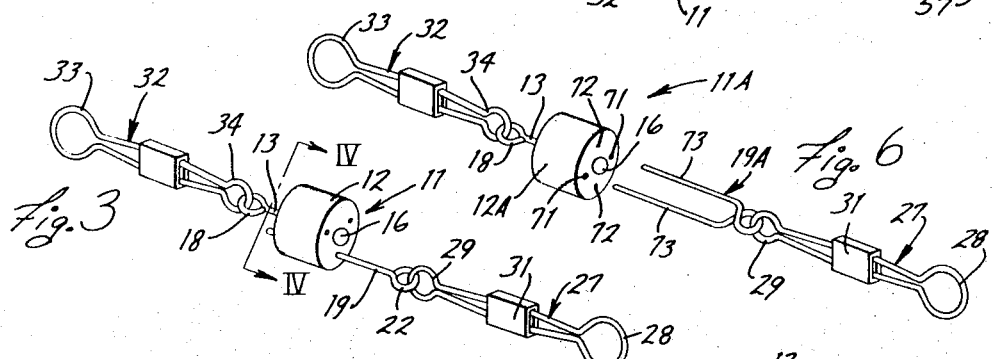
FIG. 3 is a perspective view of a release mechanism constructed according to the present invention.
FIG. 6 is a perspective view of a modified release mechanism constructed according to the present invention.
Figure 4:
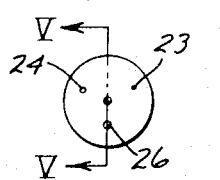
FIG. 4 is an end view taken substantially along the line IV—IV in FIG. 3.
Figure 5:
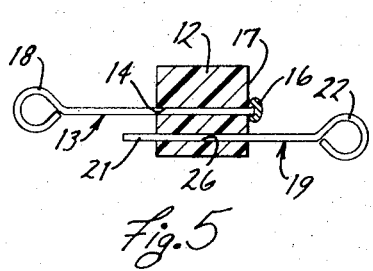
FIG. 5 is a sectional view taken substantially along the line V—V in FIG. 4.

FIGS. 3–5 illustrate therein a release device 11 constructed according to the present invention. The release device 11 includes a resilient retainer 12, which retainer is preferably constructed of elastomeric plastic or other suitable rubber-like material. The retainer 12 is preferably of a cylindrical plug-like configuration.

A first connecting pin 13 extends through an opening 14 formed in the retainer 12, which opening is preferably coaxial with the longitudinal axis of the cylindrical retainer 12. The connecting pin 14 is provided with an enlarged head or stop 16 fixedly secured adjacent one end thereof, which head is disposed adjacent and is adapted to abut against the axial end face 17 of the retainer 12. The connecting pin 13 is also provided with an integral closed eye or loop 18 adjacent the other end thereof. The hook 18 and the enlarged head 16 are disposed on opposite axial ends of the retainer 12 so as to prevent the connecting pin 13 from becoming disconnected therefrom.

The release device 11 also includes a second connecting pin 19 which is adapted to be releasably connected to the resilient retainer 12. The releasable connecting pin 19 includes a straight rod-like portion 21 having an integral closed eye or loop 22 adjacent one end thereof, which loop 22 is adapted to be disposed on the opposite axial end of the retainer 12 from the loop 18. The straight rod-like portion 21 is adapted to be slidably received within one of a plurality of bores or openings 23, 24 and 26 which extend axially through the retainer 12. The openings 23, 24 and 26 are all of different diameters and all said openings in the unstressed condition of the retainer are of smaller diameter than the straight portion 21 of the pin 19 so that when said straight portion is inserted therein, the elastomeric material is deformed and imposes a frictional force on said straight portion, thereby opposing withdrawal of said straight portion from said retainer with a selectable force. Due to the resilient material from which the retainer 12 is constructed, the rod-like portion 21 can be selectively slidably inserted into any one of the openings 23, 24 or 26 and because of the different diameters of said openings the forces by which withdrawal of the portion 21 is resisted differs from one opening to the other. The openings 23, 24 and 26 are all substantially parallel to and equidistant from the opening 14 so that the connecting pins 13 and 19 are thus disposed substantially parallel to one another as illustrated in FIG. 5.

A first swivel or link member 27, which is a conventional commercially available device, is connected to the releasable connecting pin 19. The link member 27 is shaped substantially like a dumbbell and has a closed guide loop or eye 28 adjacent one end thereof. The link member 27 also has a further loop 29 adjacent the other end thereof, which loop 29 is fixedly interconnected to the loop 22 for nonreleasably, but swivelably, connecting the link member 27 to the releasably connecting pin 19. A collar 31 surrounds the link member 27 for preventing communication between the interiors of the loops 28 and 29.

A further swivel or link member 32, identical to the link member 27 described above, is provided adjacent the other end of the release device 11. The link member 32 also includes closed loops 33 and 34 adjacent the opposite ends thereof, with the loop 34 being connected to the loop 18 for fixedly connecting the link member 32 to the retainer 12.

OPERATION

FIG. 1 illustrates therein one mode of operation of the release device 11 constructed according to the present invention. Particularly, there is illustrated a boat 41 on a body of water 42, the boat being provided with a suitable outrigger 43 of any conventional type fixedly secured thereto and extending upwardly therefrom. A fishing pole 44, as supported by a fisherman seated within the boat 41, is positioned so as to extend outwardly from the boat so that the fishing line 46 will extend rearwardly of the boat in a conventional manner for enabling trolling at a selected water depth. When trolling with an outrigger as illustrated in FIG. 1, a release device 11 constructed according to the present invention is connected between the outrigger 43 and the trolling line 46 in such a manner as to cause the portions of the trolling line as extending away from the release device 11 to be positioned at a substantial angle relative to one another. Further, the release device 11 is connected so as to be substantially aligned with the portion of the trolling line 46 which extends downwardly into the body of water so that all tension forces applied to the line 46 will first be initially transmitted to the release device 11.

When the release device 11 is used with an outrigger as illustrated in FIG. 1, the loop 33 as formed on the free end of link 32 is preferably fixedly secured to the outrigger 43, such as adjacent the upper free end thereof, whereupon the resilient retainer plug 12 is also fixedly interconnected to the outrigger 43. The trolling line 46 is then slidably guided through the loop 28 as provided adjacent the free end of the other link member 27, whereupon the line 46 will thus assume a position substantially as illustrated in FIG. 1. Accordingly, when a predetermined drag is imposed on the line 46, such as when a fish is caught on the trailing hook, the tension force imposed on the line 46 will be transmitted to the release mechanism 11 and, if the tension force is of a predetermined magnitude, the releasably connecting pin 19 will be slidably withdrawn from its selected opening, such as by being withdrawn from the opening 26, whereupon the line 46 will thus be disconnected from the retainer plug 12.

After the release device 11 has separated in the manner described above, the link member 27 and the release pin 19 will then freely slide along the line 46 until it engages the leader which is connected adjacent the free end of the line. The link 27 and releasable connecting pin 19 will remain in this position until the line 46 is wound back onto the spool of the fishing rod 44, at which time the pin 19 can then be reinserted into one of the openings 23, 24 or 26 for reuse.

Figure 2:
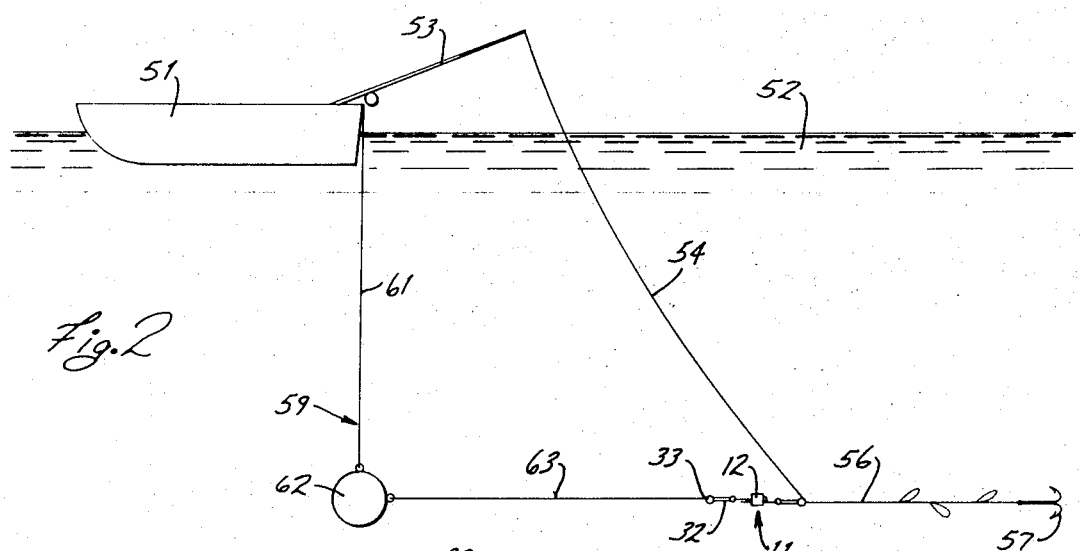
FIG. 2 illustrates therein use of a release mechanism constructed according to the present invention in conjunction with a downrigger.

FIG. 2 illustrates another mode of operation of the release device 11 constructed according to the present invention. Particularly, there is illustrated a boat 51 on a body of water 52 with a conventional fishing pole 53, as supported by a fisherman seated within the boat, being used for trolling as the boat is moved through the water. The fishing pole 53 is provided with a conventional fishing line 54 which trails outwardly from the pole and is suitably weighted to permit trolling at a selected water depth. The line 54 is provided with a conventional leader 56 connected to the free end thereof, which leader is provided with a conventional fishing hook 57 thereon.

The trolling line 54 is also connected to the boat 51 by means of a downrigger 59, which downrigger includes a first flexible line 61 which is connected at its upper end to the boat 51 and is connected at its lower end to a weight 62. A further flexible line 63 is fixedly connected at its forward end to the weight 62 and is interconnected at its other end to the trolling line 54. Particularly, the intermediate rigger line 63 is interconnected to the trolling line 54 by means of a release device 11 constructed according to the present invention. The release device 11 is positioned so that the loop 33 is fixedly secured to the rearward end of the flexible line 63, whereupon the resilient retainer plug 12 is thus fixedly connected the weight 62. On the other hand, the loop 28 as provided on the link 27 is preferably connected to the line 54, such as by being fixedly connected to the eyelet or loop which is provided at the free end of the line, as at the point of connection between the line 54 and the leader 56. This thus results in the link 27 and releasable connecting pin 19 being fixedly connected to the line 54.

When trolling with a downrigger 59 substantially as illustrated in FIG. 2, the weight 62 is initially suspended below the boat 51 at the desired trolling depth, whereupon the interconnecting line 63 and release device 11 thus result in the leader 56 and hook 57 being drawn through the water at the desired trolling depth. When a predetermined drag is imposed on the leader 56, such as due to a fish becoming caught upon the hook 57, the drag is first initially imposed on the release device 11, which drag if of the selected predetermined magnitude will cause the slide pin 19 to be withdrawn from its selected bore, whereupon a complete separation of the release device 11 will occur so as to permit the line 54 and leader 56 attached thereto to be moved away from the weight 62.

After the release device 11 has separated and the fish has been landed, the release device is again reconnected merely by slidably inserting the slide pin 19 into a selected opening 23, 24 or 26 whereupon the device is then in position to permit further trolling.

In use of the release device 11 constructed according to the present invention, the predetermined release force can be selectively varied by inserting the slide pin 19 into any one of the selected openings 23, 24 or 26. Since these openings are of different diameters, the amount of frictional engagement between the resilient material of the retainer plug 12 and the slide pin 19 will obviously vary in proportion to the size of the opening, the larger opening 26 obviously exerting less frictional engagement with the slide pin than is true of the smaller opening 23. Thus, the friction clamping force imposed on the slide pin 19, which friction clamping force is directly proportional to the axial release force, can obviously be selectively varied as desired merely by utilizing any one of the different sized openings.

A further advantage of the release device 11 according to the present invention results from the small and compact configuration thereof, which small and compact configuration results in the release device imposing only a minimum drag when used in a downrigger substantially as illustrated in FIG. 2. Further, the configuration of the release device 11 provides a stable nonspinning device, which thereby results in the most desirable and efficient operation.

ALTERNATE CONSTRUCTIONS

FIG. 6 illustrates therein a release device 11A which is identical to the release device 11 illustrated in FIGS. 3-5 except for the construction of the resilient retainer 12A and the releasable connecting pin 19A. In this embodiment the retainer 12A includes a first pair of openings or bores 71 extending axially therethrough. The openings 71 are of the same size or diameter and are disposed substantially equidistant from and on diametrically opposite sides of the opening 14 (shown in FIG. 5). The retainer 12A is also provided with a second pair of identical openings 72 which are angularly spaced from the openings 71. The openings 72 are also equidistant from the opening 14 and on diametrically opposite sides thereof. The openings 72 are of a different size or diameter from the openings 71. Further, if desired, additional pairs of different size openings could be provided in the retainer in a manner similar to the openings 71 and 72. A respective pair of openings 71 or 72 is designed to coact with the parallel leg portions 73 of the releasable connecting pin 19A for permitting the connecting pin 19A and the resilient retainer 12A to be releasably and slideably connected, with the release force being selectable by the variable diameters of the pairs of openings 71 and 72 whereby the elastomeric material of the retainer 12A imposes a selectable frictional force on the straight leg portions 73 of the connecting pin 19A. The connecting pin 19A is desirable since the force imposed on the retainer 12A by the connecting pin 19A is substantially coaxially aligned with the force imposed on the retainer 12A by the other connecting pin 13. The release device 11 is thus subjected solely to a straight line pull and is not subjected to a twisting moment.

The operation of the release device 11A is identical to the operation of the device 11 described above, and further description is thus not believed necessary.

Figure 7:
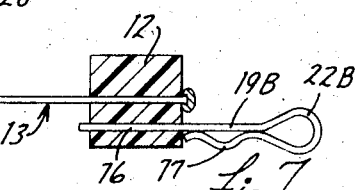
FIG. 7 is a sectional view similar to FIG. 5 and illustrating therein still a further modified release mechanism constructed according to the present invention.

FIG. 7 illustrates therein still a further modified releasable connecting pin 19B which is adapted to be releasably connected to the retainer 12. The releasable connecting pin 19B is constructed from a single piece of rod-like material and is bent so as to have a long leg 76 and a short leg 77 disposed adjacent one another and interconnected by an eyelet 22B. The long leg 76 is substantially straight and is adapted to be slideably disposed within an opening in the retainer 12. The leg 77 is substantially shorter than the leg 76 and is constructed as a wavy spring-like member whereupon the leg 77 can be resiliently deflected away from the leg 76 to permit a hook or eyelet, such as the eyelet 29 (FIG. 3), to be pulled between the legs 76 and 77 so as to be disposed within the eyelet 22B. The short leg 77 also is designed to abut the axial end face of the retainer 12 to limit the insertion of the leg 76 into the retainer 12. The operation of the device illustrated in FIG. 7 is otherwise identical to the operation of the device illustrated in FIG. 5.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A releasable fishing device for connecting a fish line to a rigging means, such as a downrigger or an outrigger, said device comprising:
   a retainer plug constructed of a resilient material;
   connecting means nonremovably secured to said retainer plug and extending axially outwardly from one end of said plug, the extending end of said connecting means having fastening means thereon adapted for interconnection with the rigging means for fixedly connecting said retainer plug to said rigging means;
   release means including a slide portion slidably and frictionally engaged by said resilient retainer plug with the frictional engagement between said plug and said portion constituting the sole means holding said release means in engagement with said retainer plug, said release means extending outwardly from the other end of said retainer plug and having second fastening means formed thereon adapted for interconnection to a fish line, whereby said release means is slidably disconnectable from said retainer plug in response to imposition of a predetermined tension force thereon for permitting said fish line to be disconnected from said rigging means; and
   means coacting between said release means and said retainer plug for permitting the release force to be selectively varied, said coacting means including a plurality of different diameter bores formed in said plug with each of said bores being adapted to have said slide portion slidably inserted therein, said slide portion having a maximum cross-sectional dimension greater than the normal diameter of the bores when the slide portion is not disposed therein so that the retainer plug will snugly but releasably engage the slide portion.

2. A device according to claim 1, wherein a first swivel member is pivotally connected to the fastening means formed on the end of said connecting means, and a second swivel member is pivotally connected to the fastening means formed on the end of aid release means, said first and second swivel members each having loop means formed on the free ends thereof.

3. A device according to claim 1, wherein said retainer plug has a substantially cylindrical configuration and is constructed of an elastomeric material, said connecting means including a first pin substantially coaxially aligned with and nonremovably connected to said cylindrical plug, said plurality of bores being disposed substantially parallel with and in surrounding relationship to said first pin, and said release means including a second pin adapted to be slidably disposed in any one of said plurality of bores.

4. In combination, a fishing line having a hook connected thereto substantially adjacent the free end thereof, a rigging device and means connecting said rigging device to said fishing line for maintaining the hook on the line at a desired water depth for permitting trolling, said last-mentioned means including a release device for permitting said fishing line to be disconnected from said rigging device when a predetermined drag is imposed on the hook, the improvement wherein said release device comprises:
   a one-piece resilient retainer member constructed of a rubber-like material, said retainer member having at least one elongated bore formed therein;
   first pin means nonremovably secured to said resilient retainer member;
   second pin means releasably connected to and frictionally engaged by said resilient retainer member, said second pin means including an elongated straight portion adapted to be slidably disposed within said bore and snugly frictionally engaged by the resilient retainer member so as to be releasably held within said bore, the frictional engagement between said straight portion and said retainer member as caused by the resilient deformation of said rubber-like material creating a predetermined force constituting the sole force preventing separation of said first pin means and said retainer member;
   first means nonreleasably connected one of said pin means to said rigging device; and
   second means nonreleasably connecting the other of said pin means to said fishing line, whereby imposition of a predetermined force on said release device causes said second pin means to be withdrawn and totally separated from said resilient retainer member for permitting the fishing line to be released from the rigging device with said other of said pin means remaining attached to said line.

5. The combination according to claim 1, wherein said retainer member member is provided with a plurality of different diameter bores formed therein with each of said bores being adapted to slidably receive therein the elongated straight portion of said second pin means.

6. The combination according to claim 5, wherein said first means comprises a dumbbell-shaped swivel member pivotally connected to said second pin means adjacent said one end of said retainer member, and said second means comprising a dumbbell-shaped swivel member pivotally connected to said first pin means adjacent the other end of said retainer member, said second swivel member being fixedly interconnected to said rigging device for nonreleasably connecting said retainer member and said first pin means to said rigging device.

7. The combination according to claim 5, wherein said retainer member is constructed from an elastomeric material and has a cylindrical drum-like configuration.

8. A releasable fishing device for connecting a fish line to a rigging means, such as a downrigger or an outrigger, said device comprising:
   a one-piece retainer plug constructed of a resilient rubber-like material, said plug having at least one elongated substantially straight bore formed therein and extending inwardly from one end of said plug, said bore being of a substantial uniform cross section throughout the longitudinal length thereof;

connecting means nonremovably secured to said retainer plug and extending outwardly from the other end of said plug, the extending end of said connecting means having fastening means thereon adapted for interconnection with the rigging means for fixedly connecting said retainer plug to said rigging means; and release means comprising a release member releasably connected and frictionally engaged by said resilient retainer plug with the frictional engagement between said plug and said release member constituting the sole means holding said release member in engagement with said retainer plug, said release member including an elongated substantially straight pin portion having a substantially uniform cross section throughout the longitudinal length thereof, said pin portion being slidably disposed within said bore and having a maximum cross section greater than the maximum cross section of said bore when the retainer plug is in an unstressed condition, whereby slidable insertion of said pin portion in said bore causes the material of said plug to resiliently deform and frictionally engage said pin portion for imposing a predetermined frictional force o said pin portion tending to oppose withdrawal of said pin portion from said plug, said release member extending outwardly from said one end of said retainer plug and having second fastening means formed thereon adapted for interconnection to a fish line, whereby said release means is slidably disconnected from said retainer plug in response to imposition of a predetermined tension force thereon for permitting said fish line to be disconnected from said rigging means.

9. A device according to claim 8, wherein said release member is separate from and free of any structural interconnection to said plug when said pin portion is removed from said bore, whereby said plug remains attached to said rigging means whereas said release member remains attached to said fishing line.

10. A device according to claim 8, wherein said plug is constructed of an elastomeric material, said bore extending throughout the length of said plug from said one end thereof to said other end thereof, and said pin portion when inserted into said bore extending completely through the length of said bore so that the free end of said pin portion is positioned adjacent said other end of said plug.

* * * * *

UNITED STATES PATENT OFFICE
CERTIFICATE OF CORRECTION

Patent No. 3,745,688         Dated July 17, 1973

Inventor(s) Winston E. Brownlee

It is certified that error appears in the above-identified patent and that said Letters Patent are hereby corrected as shown below:

Title Page, Inventor: change "149684" to ---49684---.

Col. 8, lines 25 and 26; change "predetermined force" to ---predetermined holding force---.

Col. 8, line 29; change "connected" to ---connecting---.

Col. 8, line 39; change "claim 1" to ---claim 4---.

Col. 8, line 40; change "member member" to ---member---.

Col. 8, line 46; change "a dumbbell" to ---a first dumbbell---.

Col. 8, line 47; change "second pin means" to ---first pin means---.

Col. 8, line 48; change "said one end" to ---one end---.

Col. 8, line 49; change "a dumbbell" to ---a second dumbbell---.

Col. 8, line 50; change "first pin means" to ---second pin means---.

Col. 8, lines 51 and 52; change "second swivel" to ---first swivel---.

Col. 10, line 1; change "o" to ---on---.

Signed and sealed this 27th day of November 1973.

(SEAL)
Attest:

EDWARD M. FLETCHER, JR.
Attesting Officer

RENE D. TEGTMEYER
Acting Commissioner of Patents